United States Patent [19]
Larson et al.

[11] 3,887,848
[45] June 3, 1975

[54] APPARATUS AND MATERIAL FOR PROTECTING MICROELECTRONICS FROM HIGH POTENTIAL ELECTRICITY

[75] Inventors: Willis A. Larson, Mequon, Wis.; David E. Colglazier, Minneapolis, Minn.

[73] Assignee: Magic Dot, Inc., Minneapolis, Minn.

[22] Filed: Aug. 14, 1972

[21] Appl. No.: 280,258

[52] U.S. Cl................ 317/33 R; 307/202 R; 328/5; 200/DIG. 1

[51] Int. Cl............................................... H02h 1/04

[58] Field of Search............ 328/5; 307/116, 202 R; 317/DIG. 2, 61, 61.5, 33 R; 340/365 C; 200/DIG. 1

[56] References Cited

UNITED STATES PATENTS 3,676,742 7/1972 Russell et al.................... 307/202 X

*Primary Examiner*—Robert K. Schaefer
*Assistant Examiner*—William J. Smith
*Attorney, Agent, or Firm*—Wicks & Nemer

[57] ABSTRACT

Apparatus and material for protecting microelectronics against damage from high potential electricity is disclosed in the particular form of apparatus and material for protecting a touch actuated electronic switch including microelectronic circuitry and a touch portion accessible to the touch of a human coupled to an input conductor to the microelectronic circuitry, shown as a hybrid circuit. The protective apparatus and material includes the interrelationship of a protective spark gap to the remaining circuitry of the hybrid circuit and a touch portion coating. A schematic representative of the hybrid circuit is further shown.

79 Claims, 6 Drawing Figures

APPARATUS AND MATERIAL FOR PROTECTING MICROELECTRONICS FROM HIGH POTENTIAL ELECTRICITY

CROSS REFERENCE

This invention discloses and claims an improvement of the subject matter disclosed in an application for Letters Patent filed in the name of Willis A. Larson on Mar. 17, 1972, Ser. No. 235,671.

BACKGROUND

The present invention generally relates to protective apparatus and material, more particularly relates to apparatus and material for protecting electronics against damage from high potential electricity, and still more particularly relates to apparatus and material for protecting microelectronics against damage from high potential electricity.

Static electricity of several hundred thousand volts, and typically 20,000 to 100,000 volts, can exist in the environment and in particular on the body of a human using electronic apparatus. If this high voltage is discharged through modern microelectronics including transistors and related semi-conductor devices in hybrid or integrated form, a large instantaneous current can be developed, the value depending upon the resistance of the path to the earth ground.

In circuitry using discrete resistors, capacitors, transistors, diodes and other like electronic components, protection from static electricity and other high potentials can generally be gained by providing a large value of resistance positioned between the input and the circuitry or by placing voltage breakdown diodes or tubes, for example, neon, zener, or other types between the input and earth ground, or other similar relatively large, slow, bulky techniques and devices. Further, the remaining circuitry may be generally spaced at a great distance from the input, by comparison to the distance over which high potential electricity can arc, i.e. the sparking distance of the high potential electricity.

In circuitry of the type where passive components are deposited upon a substrate, whether by thick or thin film techniques, and active components are in the form of integrated chips bonded to the depositions, often termed hybrid circuits, in circuitry of the type where all components are integrated, and in circuitry of like type, for the purposes of this invention defined as microelectronic circuitry, the problem of static and other high potential electricity is not so easily solved. If the approach of a large input resistor is used in connection with such microelectronic circuitry, this large value of input resistor can occupy a substantial space within the circuitry, a serious detriment. Also, in spite of a large value of input resistance, the extremely close spacing required in microelectronic circuitry can allow static electricity to arc between the input and other components of the circuitry without traversing the input resistance.

Thus, the problem of preventing damage to microelectronic circuitry due to the application of high potentials from static electricity or other sources is a quite distinct problem from that normally faced by the designer of discrete circuits.

A further particular problem is encountered in touch actuated electronic switches where a portion of the switch, termed a touch portion, must be accessible to the touch of a human and thus such a switch of necessity is subject to damage from static electricity carried by the human operator unless protective measures are taken.

Various applications for Letters Patent filed in the name of Willis A. Larson, solely or jointly with others, disclose and include claims to particular apparatus protecting against such a high potential discharge by using a height differential of electrodes in a touch actuated or touch sensitive electronic switch. If, however, it is desired to protect microelectronic circuitry which is not used in conjunction with a touch actuated or touch sensitive electronic switch from high potential electricity, or it is desired to use touch actuated or touch sensitive electronic switches without an electrode height differential and yet protect against high potential electricity, a need exists for further measures preventing damage to the microelectronics.

SUMMARY

The present invention solves this and other problems in protecting microelectronic circuitry from high potential electricity by providing, in the preferred embodiment, a protective spark gap arranged in association with the microelectronic circuitry to provide a preferred path for the currents caused by the high potential static electricity, which preferred path substantially bypasses the microelectronic circuitry and thus causes no damage, and by providing a coating for the touch portion of a touch actuated electronic switch, which coating is highly resistive in nature and can reduce the instantaneous currents produced by the high potential static voltage applied to the touch portion.

The present invention is described in the context of a preferred embodiment of a touch actuated electronic switch similar to that originally disclosed in application for Letters Pat., Ser. No. 253,671 referred to above.

Thus, the schematic diagram of an amplifier similar to that provided in application Ser. No. 235,671 is shown incorporating a schematic representation of a protective spark gap and resistive coating according to the present invention. Also, a hybrid arrangement of electronics is presented to illustrate the protective technique of the present invention as applied to such microelectronic circuitry.

In particular, a protective conductor is provided in association with an input resistance to the electronic circuitry to define a protective spark gap of a dimension to provide a breakdown voltage less than the breakdown voltage across the input resistance and less than the breakdown voltage to any remaining conductor within the microelectronic circuitry. Further, the protective conductor is connected to a reference within the microelectronic circuitry by a path which spaces the protective conductor from any other conductor within the microelectronic circuitry by a distance providing a breakdown voltage exceeding the breakdown voltage of the protective spark gap.

As specifically applied to the hybrid circuitry shown, the protective spark gap is of a dimension to provide a breakdown voltage which is less than the breakdown voltage from the input through the substrate upon which the hybrid circuitry is affixed and to any other conductor of the electronic circuitry on the opposite face of the substrate from the input. Further, the protective spark gap is of a dimension to provide a breakdown voltage which is less than the breakdown voltage from the input on the substrate to any conductor of the electronic circuitry on the same face as the input.

Compatibly and cooperatively arranged with the protective spark gap is a resistive coating applied to the touch portion or plate for use with the touch actuated electronic switch of the present invention which can reduce the level of currents caused by high potential static voltage applied to the touch plate.

The resistive coating is disposed upon the touch surface to form an electrically unitary resistive film, i.e. conductively interconnected, substantially covering the touch surface. The resistive material presents a distributed resistivity through itself from any point on the top surface of the coating to any point on the bottom surface and between any point on the top surface and to the input conductor to the microelectronic circuitry associated with the touch actuated electronic switch of a value sufficient to define an instantaneous current of an amount less damaging to the microelectronic circuitry upon the application of a high potential voltage to the top surface of the coating which is accessible to the touch of a human.

The material is further of a hardness providing durability sufficient to withstand continual touching by the humans, i.e. a durability and wear resistant hardness sufficient to allow the coating a life commensurate with the expected life of the touch actuated electronic switch.

It is thus an object of the present invention to provide means for protecting microelectronic circuitry against damage from static electricity or high potentials from other sources.

It is a further object of the present invention to provide a preferred combination of apparatus and material for protecting microelectronic circuitry against damage from static electricity or high potentials from other sources.

It is a further object of the present invention to provide apparatus for protecting microelectronic circuitry against damage from static electricity or high potentials from other sources.

It is a further object of the present invention to provide material for protecting microelectronic circuitry against damage from static electricity or high potentials from other sources.

These and further objects and advantages of the present invention will become clearer in the light of the following description of an illustrative embodiment of this invention described in connection with the drawings.

Figures 1, 2, 3:
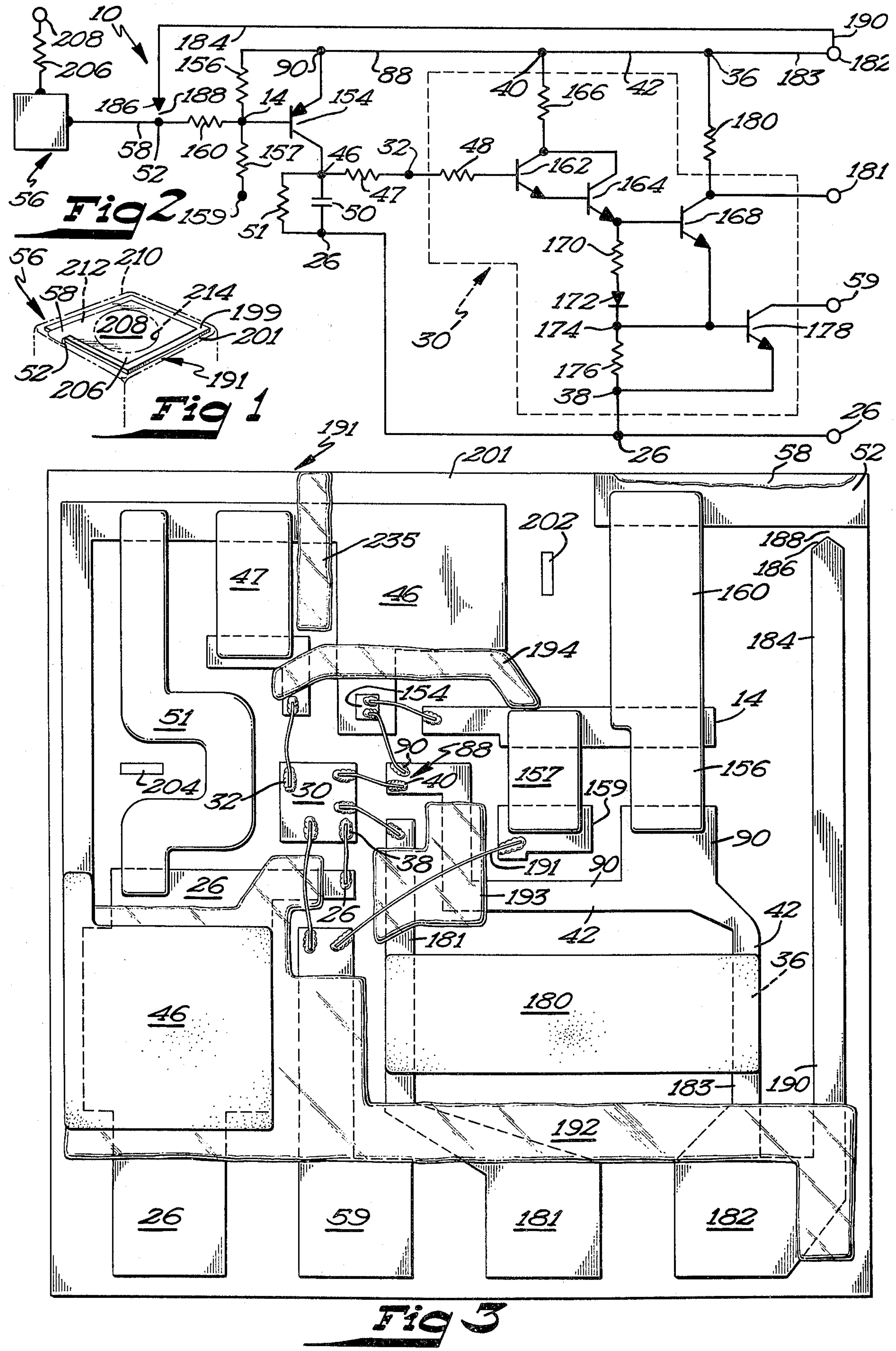
FIG. 1 shows a diagrammatic representation of a touch portion for use in association with a touch actuated electronic switch in the form of a touch plate having a resistive coating thereon according to the present invention and showing the interconnection of the touch portion to microelectronic circuitry and showing the actual encasement thereof, in dotted line.
FIG. 2 shows a schematic-diagrammatic representation of microelectronic circuitry for touch actuated electronic switches according to application Ser. No. 235,671 including the protective apparatus according to the present invention.
FIG. 3 is a top view of a hybrid arrangement of the circuitry of FIG. 1.

Where used in the various figures of the drawings, the same numerals designate the same or similar parts in the schematic-diagrammatic and the hybrid electronics. Furthermore, when the terms "right," "left," "front," "back," "vertical," "horizontal," "left edge," "right edge," and similar terms are used therein, it should be understood that these terms have reference only to the structure shown in the drawings as it would appear to a person viewing the drawings and are utilized only to facilitate describing the invention.

DESCRIPTION

In FIG. 1 a touch portion 56 is shown for a touch actuated electronic switch in the form of a ceramic substrate 191 of a preferred thickness of 25 thousandths of an inch between opposed major surfaces including a top surface 199 upon which a resistive coating designated 206 is placed comprising a touch surface 208 including a generally tab-like extension 58 which traverses the left bottom edge of substrate 191 to interconnect with a further conductor designated 52 as will be explained further hereinafter. Further, substrate 191 includes a bottom surface 201 upon which the microelectronics of the touch actuated electronic switch is fabricated, as will be explained further hereinafter.

FIG. 1 further shows the shell or plastic encasement 210, in dotted line, in which substrate 191 is mounted, which shell 210 includes a generally square top surface 212 having a generally centrally located aperture 214 defined therein to expose a portion of top surface 208 of resistive coating 206 and thus make this portion of the surface 206 accessible to the touch of a human. The remaining portions of surface 208 are masked and inaccessible to the touch of a human by the remaining top surface 212 of shell 210 around aperture 214.

In FIG. 2, microelectronic circuitry useful in association with a touch actuated electronic switch is shown and generally designated 10. Microelectronic circuitry 10 includes a diagrammatically represented touch plate 56 connected to an input terminal 52 to microelectronics 10 by means of a wire 58. A resistor 206 is shown as connected to the diagrammatically representative touch plate 56 to extend upwards of touch plate 56 to a terminal designated 208.

Resistor 206 is a schematic representation of the resistance of coating 206 of FIG. 1, while terminal 208 is a schematic/diagrammatic presentation of top surface, i.e. the touch surface, 208 of FIG. 1.

A high value resistor 160 is then connected between input 52 and junction point 14. Resistor 160 is useful in protecting humans touching touch plate 56 from any alternating voltage within circuitry 10 and further in protecting the circuitry 10 from damage due to excessive currents induced through touch plate 56, such as by a direct connection to a high voltage source or by static electricity from the human operator.

A PNP transistor 154 has its emitter connected to a junction point 90, its collector connected to a junction point 46, and its base connected to input 14. A resistor 156 is then connected between junction point 90 and input 14. A further resistor 157 is connected between junction point 14 and a further junction point 159 to provide for "latching" of the switch as will be more fully explained hereinafter.

Junction point 46 is further connected to the base of an NPN transistor 162 through a series connection of high value impedances or resistance 47, junction point 32 and resistance 48. Junction point 46 is further connected to a junction point 26 through a storage, integrating or smoothing element shown as capacitor 50. A resistor 51 is shown as connected in parallel with capacitor 50 between junction points 46 and 26.

Transistor 162 is shown in a Darlington arrangement with NPN transistor 164 and thus having their common collectors connected to a junction point 40 through a resistor 166. Junction point 40 is connected to junction point 90 by a conductor 88.

The emitter of transistor 162 is connected to the base of transistor 164, while the emitter of transistor 164 is connected to the base of a further NPN transistor 168 and to a junction point 38 through a series connection of resistor 170, diode 172, junction point 174, and resistor 176.

The collector of transistor 168 is directly connected to a junction point 181 and is connected to a junction point 36 through a resistor 180. Junction point 36 is further connected to junction point 40 by a wire 42 and to another junction point 182 by a wire 183.

Junction point 174 is also connected to the emitter of transistor 168 and to the base of an NPN transistor 178 which has its collector connected to an output terminal 59 and its emitter connected to junction point 38. Junction point 38 is then connected to an extension of junction point 26.

An amplifier designated 30 is then defined from the aforementioned parts, in particular in transistors 162, 164, 168, and 178, resistors 48, 166, 170, and 176, diode 172 and the interconnection of these parts. Amplifier 30, as will be seen specifically in FIG. 3, is in the form of an integrated structure upon a substrate.

The electrical circuitry shown in FIG. 2 operates as explained in detail in the above referred to application Ser. No. 235,671. Very basically, the touch of an operator's finger at plate 56 provides an input to transistor 154 which is amplified to charge capacitor 50. Capacitor 50, once charged, and resistors 47 and 48 approximate a current source for the high gain amplifier 30. The current from capacitor 50 is then amplified by amplifier 30 such that the electrical impedance or resistance between output terminal 59 and junction point 26 approximates an electrical short circuit in a first state and an electrical open circuit in a second state, the state depending upon whether the operator's finger is touching or not touching touch plate 56. In this manner, microelectronic circuitry 10 functions as a touch actuated electronic switch.

A further connection, designated 191, may be made between output terminal 59 and junction point 159. Such a connection is not shown in FIG. 2, however it is shown in FIG. 3. Connection 191 causes the switch circuitry of microelectronics 10 to "latch" or maintain output condition caused by the operator's touch of plate 56 in spite of the discontinuance of the operator's touch.

Microelectronic circuitry 10 of FIG. 2 is shown as protected from damage which may be caused by the application of static electricity carried by the body of the operator.

In particular, a protective conductor 184 is seen as having a first end 186 at a distance from the input 52 to the microelectronic circuitry 10 to define a protective spark gap 188. Protective conductor 184 includes a second end 190 connected to junction point 182.

Also, compatibly and cooperatively arranged with spark gap 188 is a resistor 206 which is schematically representative of the resistance of coating 206 upon top surface 199 of substrate 191 as shown in FIG. 1. Resistor 206, by its high value, reduces the instantaneous current caused by any high potential electricity applied to the surface 208 of coating 206 shown in FIG. 1 and represented as junction point 208 in FIG. 2. Thus, the application of high potential static voltage to the top surface 208 of resistive coating 206 accessible to the touch of a human operator through aperture 214 of shell 210 defines an instantaneous current, because of the presence of resistor 206, of an amount less damaging to the microelectronic circuitry 10.

It will now be appreciated by those skilled in the art that power to circuitry 10 can be applied through junction points 182 and 26. If junction point 26 is to be considered the reference or gound for circuitry 10, a voltage positive with respect to the voltage applied to junction point 26 must be applied to junction point 182. Conversely, if junction point 182 is to be considered the circuit reference or ground, a voltage negative with respect to the voltage upon junction point 182 must be applied to junction point 26. All of this is familiar to those skilled in the art.

Since, for the purposes of providing a reference for the high currents which may be caused by the application of static electricity to microelectronic circuitry 10, either a source of voltage or a reference point within a source of voltage can function as a sufficient conductor of current to earth ground, it is of no consequence as to whether reference junction point 182 is actually a source of voltage or a reference within a source of voltage.

Fig. 3 shows a top view of a hybrid arrangement of the microelectronic circuitry 10 shown in schematic form in FIG. 2. The same numerals are used to designate the same or similar parts in the schematic and the hybrid electronics. Additional parts are designated, as will become clear from the following explanation of the fabrication of the hybrid circuitry of FIG. 3.

Figures 4, 5, 6:
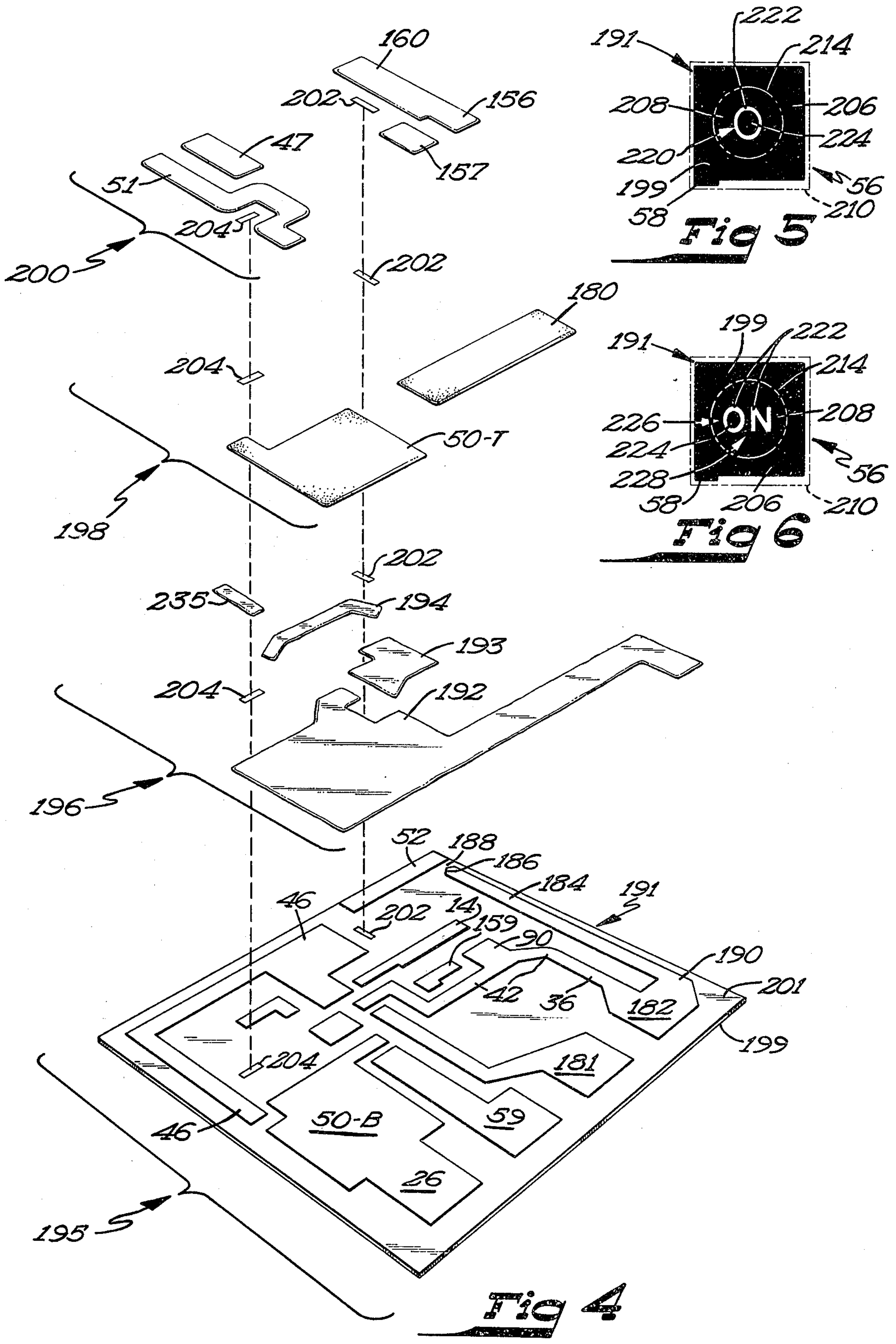
FIG. 4 is an exploded view of the various layers of the hybrid circuitry of FIG. 2.
FIGS. 5 and 6 are diagrammatic representations similar to that of FIG. 1 showing two of the multitude of patterns of the resistive coating which may be employed on the touch plate.

FIG. 4 shows an exploded view of the various layers forming the hybrid circuitry of FIG. 3. In particular, layer 195 comprises a metalization layer and is formed of conductive material providing various interconnections, the spark gap of the present invention, the bottom plate of capacitor 50, designated 50-B, various pads to which wires can be soldered, such as pads 26, 59, 181, and 182, and all other convenient conductive pads. This layer is applied as by screening, drying, and firing as is conventional.

A second layer 196 is then applied. Layer 196 is a masking glaze of dielectric glass which includes area 192, which as is seen in FIG. 2, is applied behind the solder pads 26, 59, 181, and 182 to prevent solder flow beyond the conductive pads. Layer 192 further forms the dielectic material for capacitor 50.

Various other glazed portions 193, 194, and 235 are also applied to further act as solder barriers and to provide an electrical shielding effect over previously applied conductors in the areas under which wires will ultimately extend to prevent the droop of a wire from electrically shorting various components of circuitry 10. This effect is illustrated in FIG. 3 where area 193 is shown as beneath wire 191 to prevent an inadvertent electrical connection between wire 191, solder pad 181, or the remaining conductive pads beneath wire 191.

Second layer 196 is first conventionally printed and dried. Next, a second application of glazing material is printed, dried, and fired in a double-print fabrication technique in an effort to reduce defects in the dielectric material within capacitor 50. It has been found that a double application of this masking glaze increases yields of a finished product from approximately 50 percent to approximately 97 percent.

Next, a mechanically durable, electrically unitary resistive film or layer 206 is applied to the upper surface 199 of touch plate 56. Film 206 enhances the protective aspects of the present invention as applied to microelectronic circuitry, as will be further explained hereinafter. The resistive film is mechanically durable in order to promote longevity of the system, and in order to render the surface lifetime commensurate with the lifetime of the switch itself. Accordingly, one system which has been found to be highly useful in connection with the system is either a ceramic or glass frit binder material impregnated with conductive or semiconductive particles. These compounds are commercially available and are normally defined as resistive glaze coatings. With the planar geometry of the device normally being prescribed by other parameters, the thickness of the film will determine the ultimate electrical properties.

Glass frit prepared from ordinary soda-lime soft glass or other harder glasses such as borosilicate glass (Pyrex) may be employed. In order to disperse the conductive materials through the compositions, an organic binder such as ethyl cellulose or ethoxyl T-10 with butyl carbitol may be employed. These binders are fugitive binders and are, of course, lost during firing.

Glass frits are commercially available from a wide variety of sources of supply. In addition to the normal glass frits, glass enamels may also be employed as a binder substance, with these enamels normally comprising a series of finely divided glass flux, such as lead borosilicate, intimately blended with the conductive substance. These glass enamels will provide sufficient mechanical durability for the structures.

A cermet resistive film may also be employed which utilizes metal oxides in glass frit. These cermet resistive films which are in wide use commercially include indium oxide, tungsten carbide, thallium oxide, along with certain proprietary binders. These materials are, of course, commercially available. Silver palladium mixtures are ideally suited to application to the present invention, and are also widely employed at the present time. The conduction in palladium-silver glaze resistors is controlled by palladium oxide which is a P-type semiconductor. The silver in the complex system is believed to provide better electrical contact between palladium oxide granules by surrounding them with a palladium-silver alloy. Optimum palladium-silver ratios are in the order of 1:1 with sheet resistance being controlled by controlling the ratio of Pd-Ag to glass frit, with the lower ratios having been found to provide the greater stability. Resistivity ranges for commercially available palladium-silver compositions range from 1 ohm to 5 megohms per square and higher. For given portions of palladium, silver, and glass, the resistivity can be further adjusted by the addition of controlled impurities. Antimony oxide is an impurity which may be utilized in this composition.

The resistive palladium-silver glaze resistors are preferably prepared by suspending the glass-metal mixture in an organic binder to give a viscosity in the range of 170–230 poises. The usual proportions are ⅔ glass-metal mixture to ⅓ organic materials, the organic materials being as set forth hereinabove. These compositions are screened and fired to obtain the proper or desired patterns on ceramic substrates.

An alternate composition which may be employed is obtained by mixing thallium oxide with a glass consisting of 90 percent lead borosilicate glass and 10 percent oxide. Thallium oxide of finely divided particle size may be obtained commercially, with average particle sizes in the range of 0.2 microns being useful. The glass, as indicated, has an average particle size which is greater than that of the conductor, with the average particle size being approximately 1.5 microns. Glass compositions containing 90 percent lead borosilicate and 10 percent zinc oxide have a softening point of about 520° C. The mixtures may be prepared with an organic binder containing ethyl cellulose, butyl carbitol and ethyl alcohol to form a paste having a controllable viscosity. The ratios of the binder components are within the skill of the artisan.

Thallium oxide cermet resistive films have higher resistivities than those of the silver-palladium type, and normally lie in the range of from 300 ohms to 1 megohm per square and higher.

As has been indicated, both conductors and semi-conductors may be employed in the resistive films utilized in connection with the concepts of the present invention. Among the conductors and semi-conductors which may be employed are the following:

| | | |
|---|---|---|
| Aluminum | Carbon | Palladium |
| Antimony | German silver, 18% Ni | |
| Arsenic | Gold | Phosphor bronze |
| Bismuth | Iron | Platinum |
| Brass | Lead | Ruthenium |
| Cadmium | Magnesium | Silver |
| Climax metal | Manganin | Steel |
| Cobalt | Mercury | Tantalum |
| Constantan | Molybdenum | Therlo |
| Copper | Monel metal | Tin |
| Excello metal | Nichrome | Tungsten |
| | | Zinc |

As can be appreciated, these materials are preferably rendered in finely divided form and dispersed in an appropriate binder and applied to the surface 199 of the ceramic 191 to form coating 206 upon touch plate 57.

It will also be appreciated that organic films may be employed with conductive particles, metals or alloys, dispersed therethrough. These films can be made sufficiently durable so as to become long lasting.

In still another aspect of the invention, these conductors may be dispersed throughout a cast film of plastic substances such as, for example, polyolefins, including polyethylene and polypropylene, acetates, nylon, Teflon, as well as phenol-formaldehyde base substances. Conductive films of this type are commercially available. When this type of resistive film is utilized, it is normally desirable to secure the film by means of a layer of adhesive onto the touch plate surface. Such films will, of course, have adequate durability.

In the event binder components are deemed undesirable, one may employ a film of stannous oxide, which will adhere directly to the touch plate surface. The preparation of stannous oxide films on a substrate surface is a well-known art.

Metallic films, either in elemental or alloy form, may be utilized, particularly when possessing sufficient durability for the application. Thin evaporatively deposited films of gold, silver, nichrome or the like may be found useful in this regard.

Metallic oxide films may also be found useful, with film applying techniques such as evaporative deposition or sputter deposition being available. Thallium oxide or other highly resistive films may be so applied and used for this purpose.

Turning now to the electrical properties of the finished film particularly as is illustrated in the embodiment of FIG. 1, as 206, a resistivity of 20,000 ohms per square is utilized to prepare a resistive device having a resistance value of 0.5 megohms wherein the film is disposed on a substrate of 0.440 by 0.440 inches, with a central aperture of 0.290 inches in diameter superimposed thereon, and with the fired film having a thickness of 0.0006 inches. Such films are obtainable in connection with those conductors or semi-conductors and binders listed hereinabove, and specifically in connection with the silver-palladium or ruthenium resistive films.

The resistive coatings 206, such as, for example, the silver-palladium coatings or other coatings utilizing either a single component film or a conductorbinder complex can provide a significant advantage in isolation of the touch actuated switch from humid environments. For example, in conditions of high humidity or exposure to salt-spray or the like, resistive coatings 206 including a glass or conductive epoxy binder will seal or otherwise encapsulate the substrate 191 and the switch from an undesirable humid ambient environment. These resistive coatings are mechanically durable, and hence can withstand extended periods of exposure to either humid environments or salt-spray environments.

This conductive or semi-conductive material as set out above, is printed, dried and fired on one face 199 of substrate 191 which forms touch plate 56 to form layer 206, the hybrid circuitry shown in FIGS. 2 and 3 being applied to the opposite face 200 of substrate 191.

It will be noted that the pattern of resistive material 206 applied to face 199 of substrate 191 includes a projecting tab portion 58. Tab portion 58 forms a portion of conductor 58 shown in FIG. 2. The remaining portion of tab 58 may be formed by dipping, painting, or printing a wrap-around conductor between the tab portion 58 of coating 206 and the input 52 formed on the underside 201 of substrate 191. The material for this wrap-around conductor may be a conductor or it may be the same or similar to film 206 to further enhance the value of resistor 206.

As can be seen from FIGS. 5 and 6, coating 206 can be screened into a pattern to include numbers, letters, words, such as the 0 designated 220 in FIG. 5 or the word "ON" formed of the letters designated 226 and 228 in FIG. 6, and other useful switch nomenclature or indicia. Coating 206 will yet be electrically unitary, with the exception of separated portion 224, but not uniform to thus expose portions of top surface 199 of substrate 191, such as exposed portions designated 222 in FIGS. 5 and 6 which give the appearance of 0 and "ON." Layer 206 may also take other forms such as more complicated grid, pattern, or array of electrically unitary material.

Since the preferred material for substrate 191 is ceramic, which is highly porous and thus subject to the accumulation of dirt and other foreign material, if a pattern such as a number, letter, word, or the like is to be screened on the face 199, face 199 first must be sealed as by first printing a glass layer. This glass layer then underlies coating 206 and allows a mere wipe to clean foreign material from the exposed portions 222 of FIGS. 5 and 6.

Printing resistive layer 206 in an electrically unitary pattern of letters, numbers, words, and the like does not interfere with its resistive function and further provides a designation of the switch which is immediately visible and avoids the necessity of further labeling of the switch.

Third layer 198 is subsequently printed and dried. Third layer 198 thus forms resistor 180, which has a value of approximately 3000 ohms and also forms the top plate of capacitor 50 designated 50-T in FIG. 4. The formation of the top plate of capacitor 50 of resistive material is deemed a novel approach which would otherwise require multiple applications of first, a pure conductor and second, a resistive material for the resistor 180, of a value of 3000 ohms in the preferred embodiment shown. Because the impedance presented by resistors 47 and 48 is in the order of 5 megohms, the application of a resistive coating of approximately 1000 ohms per square to form the top of capacitor 50 has been found to provide no discernable effect.

Lastly, the fourth layer 200 is printed in the form of a resistance of, in the preferred embodiment, 5 megohms per square to thus form resistor 51 which is on the order of 50 megohms, resistor 47 which in on the order of 5–7 megohms, resistors 157 and 156, which are on the order of 2–4 megohms each, and resistor 160 which is on the order of 2–10 megohms. Layer 200 is dried and the third and fourth layers 198 and 200 are fired simultaneously.

It will of course be realized by those skilled in the art that layers 195, 196, and 198 and 200 are applied from masks. To assure the correct correspondence and alignment of layers, it is to be noticed that orientation marks 202 and 204 appear on each layer of FIG. 3 and in FIG. 2.

OPERATION

Basically the protective means of the present invention provides apparatus and material for protecting microelectronic circuitry from damage due to the application of high potential electricity. In particular, the present invention provides for the protection of touch actuated electronic switches including such microelectronic circuitry and including a touch portion, accessible to the touch of a human, coupled to an input conductor to the microelectronic circuitry. The means includes a resistive material applied to the touch portion and a spark gap used in conjunction with the microelectronic circuitry.

Basically the resistive coating as described in detail above, is disposed upon the touch portion to form a touch surface of an electrically unitary resistive film upon the touch portion. The resistive material includes a top surface 208 accessible to the touch of a human operator and a bottom surface secured to the touch portion, in the case shown top surface 199 of substrate 191. The resistive coating 206 presents a distributed resistivity from any point on the top surface 208 to any point on the bottom surface of a value sufficient to define an instantaneous current of an amount less damaging to the microelectronic circuitry 10 associated with the touch actuated electronic switch if, for example, substrate 191 or a portion thereof is of material of much higher conductivity than coating 206 and is connected to input 52, and the resistive coating further presents a resistivity between any point on the electrically unitary top surface accessible to a human, i.e. that portion accessible through aperture 214, and the input conductor 52 to the microelectronic circuitry 10 associated with the touch actuated electronic switch of a value sufficient to define an instantaneous current of an amount less damaging to the microelectronic circuitry upon the application of a high potential static voltage to the top surface 208 of the resistive coating accessible to the touch of a human operator.

Further, the protective apparatus of the present invention provides a spark gap 188 and a favored path to a reference for static electricity through conductor 184 and junction point 182 whereby any current caused by static electricity applied to the microelectronic circuitry 10 through input 52 is conducted to a circuit reference without passing in any harmful way through the microelectronic circuitry. Of course, because of the voltage divider action between spark gap 188 and the input resistance to the circuit, such as resistor 160, some extremely minute portion of current must necessarily flow through both portions of the voltage divider, but the portion flowing through the microelectronic circuitry is limited to a value not harmful to the circuitry.

In particular, microelectronic circuitry 10 includes a portion unshielded from the general environment and unshielded from the touch of a human in particular in the form of touch plate 56. In fact, touch plate 56 is specifically intended for touch by a human to operate the electronic switch. The microelectronic circuitry 10 includes an input 52 coupling the unshielded touch plate 56, which as stated is accessible to the touch of a human and intended to be so, to the remainder of the microelectronic circuitry 10.

The apparatus for protecting the microelectronic circuitry 10 from damage due to the static electricity applied to touch plate 56 then also includes an electrical resistance between input 52 and the remainder of the microelectronic circuitry, such as electrical resistance 160. Electrical resistance 160 is of a high value, i.e. 2–10 megohms in the preferred embodiment, due to the capability of the circuitry 10 of FIG. 1 to operate at extremely low levels. The value of resistor 160 need not be of the megohm level; however, the danger of damage due to the static electricity, with the lowering of the value of resistor 160, is increased.

As best seen in FIG. 3, the protective apparatus of the present invention further includes protective conductor 184 having one end 186 of a generally pointed configuration and arranged at a distance from input 52 to the electronic circuitry to define a protective spark gap 188 between the pointed portion of the one end 186 and the near edge of input conductor 52 of a dimension providing a breakdown voltage which is less than the breakdown voltage across the electrical resistance 160 at the input of circuitry 10. Further, the protective spark gap is of a dimension to provide a breakdown voltage less than the breakdown voltage to any remaining conductive portion within the microelectronic circuitry 10, i.e. a conductor, active element, passive element, or the like.

Protective conductor 184 further includes a second end 190 connected directly to a reference for the microelectronic circuitry.

Still further, the entire protective conductor 184 is spaced from any remaining conductive portion within the microelectronic circuitry 10 by a distance providing a breakdown voltage exceeding the breakdown voltage of the protective spark gap 188 between the first end 186 of protective conductor 184 and the input 52.

Thus, a favored path for static electricity applied to touch plate 56 and thus to input 52 of microelectronic circuitry 10 is provided such that the current caused by the applied high potential static electricity arcs across the protective spark gap 188 and is conducted by protective conductor 184 to the reference for the microelectronic circuitry 10 to thus conduct the current caused by the high potential static electricity to the reference for the microelectronic circuitry 10 without passing in any harmful way through the microelectronic circuitry 10 and causing damage.

It is to be noted that if protective conductor 184 were not to be connected directly to junction point 182 but to, for example, junction point 90, spark gap 188 would electrically be connected to the identical reference point 182. It has been found, however, that because protective conductor 184 would then be electrically connected with a portion of the remaining conductive portions within circuitry 10, damage can result. Thus, it has been found that a separate path is required. That is, a connection to junction point 90 will provide a fixed impedance to earth ground by several differing paths, and thus the static current due to the static electricity applied at input 52 will divide between whatever path to ground is provided through junction point 90 and whatever path to ground is provided through the remaining connections to junction point 182. Since either impedance can be quite small, and since the voltage applied by static electricity can be in the order of many thousands of volts, an extremely high instantaneous current may thus be caused to flow through both paths of the voltage divider formed.

Thus, although the path from junction point to junction point 182 may be of an impedance to cause the substantial majority of current to flow in this manner, even a minute percentage of an extremely high current generated by static electricity flowing through any alternate path from junction point 90 can be harmful and severely damage or destroy portions or all of the microelectronic circuitry.

Another factor must be considered where the electronic circuitry is affixed to a substrate, such as substrate 191. Here again the protective spark gap 188 must be of a dimension to provide a breakdown voltage which is less than the breakdown voltage from the input 52 to any conductor of electricity on the first side or face 201 of the substrate 191 but must further be of a dimension providing a breakdown voltage which is less than the breakdown voltage through the thickness of the substrate 191 between the face 199 upon which the material forming touch plate 56 is deposited and face 201 upon which the electronic circuitry 10 is fashioned between input 52 and any remaining conductive portion of the microelectronic circuitry on face 199 of the substrate.

Thus, for the 25 thousandths of an inch thick ceramic substrate preferred for substrate 191, a 400 volts per mil substrate breakdown voltage has been found to exist allowing a 10,000 volt breakdown strength. To comply with the requirement of the present invention of a protective spark gap 188 of a dimension which provides a breakdown voltage through the thickness of the substrate between the input 52 and any conductor of electronic circuitry on the face of the substrate opposite the input, a distance between the pointed end 188 of protective conductor 184 and the nearest edge of input 52 of 5–10 thousandths of an inch has been found to suffice.

Further, to comply with the further requirements of the present invention that a protective spark gap 188 be of a dimension which provides a breakdown voltage which is less than the breakdown voltage across the electrical resistance arranged between the input 52 and the remainder of the microelectronic circuitry 10, the electrical resistance 160 has been positioned lengthwise and parallel to the protective conductor 184 rather than parallel to input 52 which would present a lesser distance. Thus, a protective spark gap of a distance between the pointed portion of end 186 and the nearest edge of input 152 of 5–10 thousandths of an inch has been found to provide a breakdown voltage less than the breakdown voltage across resistor 160 and has further been found to comply with the remaining requirement that the protective spark gap be of a dimension providing a breakdown voltage which is less than the breakdown voltage to any remaining conductive portion within the microelectronic circuitry, so long as the remaining conductors and other portions are spaced a minimum of at least twenty thousandths of an inch from protective conductor 184.

The use of an electrically resistive coating 206 upon touch plate 56 aids, integrates, cooperates, and coordinates with the apparatus of spark gap 188 in several ways to protect the touch actuated electronic switch from currents defined by high potential electricity applied to the switch.

Further, use of a resistive coating 206 by its presence and resistance allows a lower value for input resistor 160 and therefore a further reduction in the size requirements upon this resistor and the microelectronic circuitry in general.

Further, because of the reduction in voltage applied to input 52 because of the voltage division between the resistance provided by the resistivity of coating 206 and the remaining resistance provided from input 52 of microelectronic circuitry 10 to earth ground, spacing within a hybrid circuit, for example, may be reduced. Therefore, the use of the resistive coating 206 upon touch plate 56 can further reduce the size of a microelectronic circuit, a much desired result.

Alternately, the value of static electricity which may be applied is a general unknown ranging from tens of volts to 100,000 to 200,000 volts. Therefore, for microelectronic circuitry 10 having a capability of being damaged by, for example, a one hundred milliampere current, a resistive face in the megohm range may not be sufficient to prevent a current greater than the damaging current to flow into microelectronic circuitry 10.

To take a specific example, assume the resistance of coating 206 is 0.5 megohm and the resistance of resistor 160 is 5 megohms and the voltage applied is approximately 100,000 volts. In this case, the current applied to the base of transistor 154 will be approximately determined by the division of the 100,000 volts applied potential by 5.5 megohms, which is in the range of twenty milliamperes. Thus, for a delicate circuit damaged by currents in the 1 to 10 milliampere range, the use of resistive coating 206 alone will not suffice. It will be noted further in the example given that approximately 90 percent of the applied voltage will appear at junction point 52, and with the inclusion of spark gap 188, the current generated by this static voltage will be conducted safely to the reference for the microelectronic circuitry as explained above. Thus, in the example provided, both techniques are required.

If the microelectronic circuitry can accept rather substantial currents in the 2 to 500 milliampere range, a one-half megohm resistive coating 206 alone may suffice to define a current below this 2 to 500 milliampere destructive amount tolerable by the microelectronics in this example to prevent damage from a 100,000 volt potential, especially if additional resistance can be provided through resistor 160.

Notice that it is assumed that the durability of coating 206 will not allow it to wear away or its protective function is lost.

Alternately in the event of damage to protective conductor 184, for example due to the repetitive conduction of high amperage current, the circuit may necessarily rely on the reduction in that current provided by the resistivity of coating 206.

Therefore, once the teachings of the present invention have been explained, one skilled in the art recognizing the requirements of a particular microelectronic circuitry can decide whether to utilize the resistive coating alone, the spark gap apparatus alone, or to require the safest, most efficient preferred protective means in the combination of the two to limit current and further shunt high potential voltage.

Now that the basic teachings of the present invention have been explained, many extensions and variations will be obvious to one having ordinary skill in the art. For example, while the protective means of the present invention have been explained with respect to a hybrid circuit, it will be realized that the identic teachings may be applied to an integrated structure where, for example, a gap in the matalization of ½ to 2,000ths of an inch may provide a sufficient spark gap 188 and the protective resistive coating 206 remains unchanged.

Further the protective spark gap 188 may extend vertically through a hybrid substrate or integrated structure. In fact, if the input 52 is positioned over and correctly distanced from, with respect to the substrate material used, a reference such as the pad forming junction point 182, the protective conductor 184 may be combined with the reference such that the reference, while a unitary conductor, such as pad 182 of FIGS. 3 and 4, may be viewed as the intimate connection of the protective conductor and the conductor to the reference.

Thus, since the invention disclosed herein may be embodied in other specific forms without departing from the spirit or general characteristics thereof some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. In a touch actuated electronic switch including microelectronic circuitry and including a touch portion, accessible to the touch of a human, coupled to an input conductor to the microelectronic circuitry, means for protecting the microelectronic circuitry from damage due to the application of high potential electricity to the touch portion, comprising in combination: a coating of electrically resistive material disposed upon the touch portion and forming an electrically unitary resistive film upon the touch portion, the resistive material including a top surface accessible to the touch of a human operator and a bottom surface secured to the touch portion, the coating presenting a distributed resistance through the resistive material from any point on the top surface to any point on the bottom surface of a value sufficient to define a current of an amount less damaging to the microelectronic circuitry associated with the touch actuated electronic switch upon the application of high potential voltage to the top surface of the coating accessible to the touch of a human, the coating further presenting a resistance between any point on the top surface accessible to the touch of a human and the input conductor to the microelectronic circuitry associated with the touch actuated electronic switch of a value sufficient to define a current of an amount less damaging to the microelectronic circuitry upon the application of a high potential voltage to the top surface of the coating accessible to the touch of a human, the material being of a hardness providing durability to withstand continual touching by humans; means for providing a connection to a reference for the microelectronic circuitry; electrical resistance means arranged between the input conductor and the remainder of the microelectronic circuitry; protective conductor means having one end thereof arranged at a distance from the input conductor to the microelectronic circuitry to define a protective spark gap between the one end and the input conductor of a breakdown voltage less than the breakdown voltage across the electrical resistance means and of a breakdown voltage less than the breakdown voltage from the input conductor to any remaining conductive portion within the microelectronic circuitry, the protective conductor electrically connected directly to the means for providing a connection to a reference for the microelectronic circuitry, the entire protective conductor means spaced from any remaining conductive portion within the microelectronic circuitry by a distance providing a breakdown voltage exceeding the breakdown voltage of the protective spark gap to provide a favored and preferred path for any high potential electricity applied to the input conductor such that the applied electricity arcs across the protective spark gap and is conducted by the protective conductor means to the means for providing a connection to a reference for the microelectronic circuitry to thus provide a conductive path for any current created by the electricity to the reference for the microelectronic circuitry without passing in any harmful way through the microelectronic circuitry.

2. The touch actuated electronic switch of claim 1, wherein the protective spark gap is defined between a generally pointed portion of the protective conductor and the input conductor.

3. The touch actuated electronic switch of claim 2, wherein the microelectronic circuitry is affixed to a substrate having opposed major faces including first face and a second face spaced from the first face by the thickness of the substrate, wherein the input is a pad on the first face of the substrate, wherein the protective spark gap is of a dimension to provide a breakdown voltage less than the breakdown voltage through the thickness of the substrate between the input conductor and any remaining conductive portion of microelectronic circuitry on the second face of the substrate; and wherein the protective spark gap is of a dimension to provide a breakdown voltage less than the breakdown voltage from the input conductor to any remaining conductive portion of electricity on the first side of the substrate.

4. The touch actuated electronic switch of claim 3, wherein a non conductive masking material is provided defining a generally centrally located aperture therein, the masking material preventing the touch of a human from access to the edges of the resistive material while the aperture therein provides access of the human to that portion of the resistive material disposed generally centrally upon the touch surface.

5. The touch actuated electronic switch of claim 4, wherein the resistive material provides a durability and wear-resistant hardness sufficient to allow the coating a life commensurate with the expected life of the touch actuated electronic switch.

6. The touch actuated electronic switch of claim 5 wherein the resistive material is disposed in an encapsulating relationship upon the touch portion and provides a sealing coating to the touch actuated electronic switch for isolation against humid environments.

7. The touch actuated electronic switch of claim 5 wherein the resistive material comprises a component selected from the group consisting of conductive and semi-conductive materials applied to the touch portion as a cohesive film to form an electrically unitary resistive film.

8. The touch actuated electronic switch of claim 6, wherein the resistive coating is coupled to the input conductor by material of the resistive coating extended around the edge of the touch portion.

9. The touch actuated electronic switch of claim 8, wherein the resistive material is disposed in an encapsulating relationship upon the touch portion and provides a sealing coating to touch actuated electronic switch for isolation against humid environments.

10. The touch actuated electronic switch of claim 5, wherein the resistive material comprises a first component selected from the group consisting of conductive and semi-conductive materials dispersed in a binder arranged to cohesively bind the first component into a unitary electrically resistive film.

11. The touch actuated electronic switch of claim 10, wherein the resistive coating is coupled to the input conductor by material of the resistive coating extended around the edge of the touch portion.

12. The touch actuated electronic switch of claim 11, wherein the resistive material is disposed in an encapsulating relationship upon the touch portion and provides a sealing coating to the touch actuated electronic switch for isolation against humid environments.

13. The touch actuated electronic switch of claim 1, wherein the microelectronic circuitry is affixed to a substrate having opposed major faces including first face and a second face spaced from the first face by the thickness of the substrate, wherein the input is a pad on the first face of the substrate, wherein the protective spark gap is of a dimension to provide a breakdown voltage less than the breakdown voltage through the thickness of the substrate between the input conductor and any remaining conductive portion of microelectronic circuitry on the second face of the substrate; and wherein the protective spark tap is of a dimension to provide a breakdown voltage less than the breakdown voltage from the input conductor to any remaining conductive portion on the first side of the substrate.

14. The touch actuated electronic switch of claim 13, wherein the resistive coating is coupled to the input conductor by material of the resistive coating extended around the edge of the touch portion.

15. The touch actuated electronic switch of claim 13, wherein a non-conductive masking material is provided defining a generally centrally located aperture therein, the masking material preventing the touch of a human from access to the edges of the resistive material while the aperture therein provides access of the human to that portion of the resistive material disposed generally centrally upon the touch surface.

16. The touch actuated electronic switch of claim 13, wherein the resistive material is disposed in an encapsulating relationship upon the touch portion and provides a sealing coating to the touch actuated electronic switch for isolation against humid environments.

17. The touch actuated electronic switch of claim 13, wherein the resistive material provides a durability and wear-resistant hardness sufficient to allow the coating a life commensurate with the expected life of the touch actuated electronic switch.

18. The touch actuated electronic switch of claim 17, wherein the resistive material comprises a component selected from the group consisting of conductive and semi-conductive materials applied to the touch portion as a cohesive film to form an electrically unitary resistive film.

19. The touch actuated electronic switch of claim 18, wherein the resistive material is disposed in an encapsulating relationship upon the touch portion and provides a sealing coating to the touch actuated electronic switch for isolation against humid environments.

20. The touch actuated electronic switch of claim 17, wherein the resistive material comprises a first component selected from the group consisting of conductive and semi-conductive materials dispersed in a binder and arranged to cohesively bind the first component into a unitary electrically resistive film.

21. The touch actuated electronic switch of claim 20 wherein the resistive material is disposed in an encapsulating relationship upon the touch portion and provides a sealing coating to the touch actuated electronic switch for isolation against humid environments.

22. The touch actuated electronic switch of claim 13, wherein the resistive material comprises a component selected from the group consisting of conductive and semi-conductive materials applied to the touch portion as a cohesive film to form an electrically unitary resistive film.

23. The touch actuated electronic switch of claim 22, wherein the resistive material is disposed in an encapsulating relationship upon the touch portion and provides a sealing coating to the touch actuated electronic switch for isolation against humid environments.

24. The touch actuated electronic switch of claim 13, wherein the resistive material comprises a first component selected from the group consisting of conductive and semi-conductive materials dispersed in a binder arranged to cohesively bind the first component into a unitary electrically resistive film.

25. The touch actuated electronic switch of claim 24 wherein the resistive material is disposed in an encapsulating relationship upon the touch portion and provides a sealing coating to the touch actuated electronic switch for isolation against humid environments.

26. The touch actuated electronic switch of claim 1, wherein the resistive material provides a durability and wear-resistant hardness sufficient to allow the coating a life commensurate with the expected life of the touch actuated electronic switch.

27. The touch actuated electronic switch of claim 1, wherein the resistive material comprises a component selected from the group consisting of conductive and semi-conductive materials applied to the touch portion as a cohesive film to form an electrically unitary resistive film.

28. The touch actuated electronic switch of claim 27, wherein the resistive coating is coupled to the input conductor by material of the resistive coating extended around the edge of the touch portion.

29. The touch actuated electronic switch of claim 1, wherein the resistive material comprises a first component selected from the group consisting of conductive and semi-conductive materials dispersed in a binder and arranged to cohesively bind the first component into a unitary electrically resistive film.

30. The touch actuated electronic switch of claim 29, wherein the resistive coating is coupled to the input conductor by material of the resistive coating extended around the edge of the touch portion.

31. The touch actuated electronic switch of claim 1, wherein a non-conductive masking material is provided defining a generally centrally located aperture therein, the masking material preventing the touch of a human from access to the edges of the resistive material while the aperture therein provides access of the human to that portion of the resistive material disposed generally centrally upon the touch surface.

32. The touch actuated electronic switch of claim 1, wherein the resistive coating is coupled to the input conductor by material of the resistive coating extended around the edge of the touch portion.

33. The touch actuated electronic switch of claim 1, wherein the resistive material is disposed in an encapsulating relationship upon the touch portion and provides a sealing coating to the touch actuated electronic switch for isolation against humid environments.

34. In microelectronic circuitry including a portion unshielded from the touch of a human with the microelectronic circuitry including an input conductor coupling the touch portion to the remainder of the microelectronic circuitry, means for protecting the microelectronic circuitry from damage due to the application of hich potential electricity to the touch portion, comprising in combination: means for providing a connection to a reference for the microelectronic circuitry; electrical resistance means arranged between the input conductor and the remainder of the microelectronic circuitry; protective conductor means having one end thereof arranged at a distance from the input conductor to the microelectronic circuitry to define a protective spark gap between the one end and the input conductor of a breakdown voltage less than the breakdown voltage from the input conductor to any remaining conductive portion within the microelectronic circuitry, the protective conductor electrically connected directly to the means for providing a connection to a reference for the microelectronic circuitry, the entire protective conductor means spaced from any remaining conductive portions within the microelectronic circuitry by a distance providing a breakdown voltage exceeding the breakdown voltage of the protective spark gap to provide a favored and preferred path for any high potential electricity applied to the input conductor such that the applied electricity arcs across the protective spark gap and is conducted by the protective conductor means to the means for providing a connection to a reference for the microelectronic circuitry to thus provide a conductive path for any current created by the electricity to the reference for the microelectronic circuitry without passing in any harmful way through the microelectronic circuitry.

35. The protective apparatus of claim 34, wherein the protective spark gap is defined between a generally pointed portion of the protective conductor and the input conductor.

36. The protective apparatus of claim 35, wherein the microelectronic circuitry is affixed to a substrate having opposed major faces including first face and a second face spaced from the first face by the thickness of the substrate, wherein the input is a pad on the first face of the substrate, wherein the protective spark gap is of a dimension to provide a breakdown voltage less than the breakdown voltage through the thickness of the substrate between the input conductor and any remaining conductive portion of microelectronic circuitry on the second face of the substrate; and wherein the protective spark gap is of a dimension to provide a breakdown voltage less than the breakdown voltage from the input conductor to any remaining conductive portion on the first side of the substrate.

37. The touch actuated electronic switch of claim 36, within the spark gap is substantially 5 to 10,000ths of an inch in dimension and wherein the remaining conductive portions are spaced substantially 20,000ths of an inch from the protective conductor.

38. The touch actuated electronic switch of claim 35, within the spark gap is substantially 5 to 10,000ths of an inch in dimension and wherein the remaining conductive portions are spaced substantially 20,000ths of an inch from the protective conductor.

39. The touch actuated electronic switch of claim 34, within the spark gap is substantially five to ten thousandths of an inch in dimension and wherein the remaining conductive portions are spaced substantially 20,000ths of an inch from the protective conductor.

40. The protective apparatus of claim 39, wherein the protective spark gap is defined between a generally pointed portion of the protective conductor and the input conductor.

41. The protective apparatus of claim 40, wherein the microelectronic circuitry is affixed to a substrate having opposed major faces including first face and a second face spaced from the first face by the thickness of the substrate, wherein the input is a pad on the first face of the substrate, wherein the protective spark gap is of a dimension to provide a breakdown voltage less than the breakdown voltage through the thickness of the substrate between the input conductor and any remaining conductive portion of microelectronic circuitry on the second face of the substrate; and wherein the protective spark gap is of a dimension to provide a breakdown voltage less than the breakdown voltage from the input conductor to any remaining conductive portion on the first side of the substrate.

42. The protective apparatus of claim 34, wherein the microelectronic circuitry is affixed to a substrate having opposed major faces including first face and a second face spaced from the first face by the thickness of the substrate, wherein the input is a pad on the first face of the substrate, wherein the protective spark gap is of a dimension to provide a breakdown voltage less than the breakdown voltage through the thickness of the substrate between the input conductor and any remaining conductive portion of microelectronic circuitry on the second face of the substrate; and wherein the protective spark gap is of a dimension to provide a breakdown voltage less than the breakdown voltage from the input conductor to any remaining conductive portion on the first side of the substrate.

43. The touch actuated electronic switch of claim 42, within the spark gap is substantially five to ten thousandths of an inch in dimension and wherein the remaining conductive portions are spaced substantially twenty thousandths of an inch from the protective conductor.

44. The protective apparatus of claim 43, wherein the protective spark gap is defined between a generally pointed portion of the protective conductor and the input conductor.

45. The protective apparatus of claim 43, wherein the protective spark gap is defined between a generally pointed portion of the protective conductor and the input conductor.

46. In a touch actuated electronic switch including a touch portion and microelectronic circuitry including an input conductor coupled with the touch portion, means for protecting the microelectronic circuitry from damage due to the application of high potential electricity to the touch portion, comprising: a coating of electrically resistive material disposed upon the touch portion and forming an electrically unitary resistive film upon the touch portion, the resistive material including a top surface accessible to the touch of a human operator and a bottom surface secured to the touch portion, the coating presenting a distributed resistivity through the resistive material from any point on the top surface to any point on the bottom surface of a value sufficient to define a current of an amount less damaging to the microelectronic circuitry associated with the touch actuated electronic switch upon the application of high potential voltage to the top surface of the coating accessible to the touch of a human, the coating further presenting a resistivity between any point on the top surface accessible to the touch of a human the input conductor to the microelectronic circuitry associated with the touch actuated electronic switch of a value sufficient to define a current of an amount less damaging to the microelectronic circuitry upon the application of a high potential voltage to the top suface of the coating accessible to the touch of a human, the material being of a hardness providing durability to withstand continual touching by humans.

47. The touch actuated electronic switch means of claim 46, wherein a non conductive masking material is provided defining a generally centrally located aperture therein, the masking material preventing the touch of a human from access to the edges of the resistive material while the aperture therein provides access of the human to that portion of the resistive material disposed generally centrally upon the touch portion.

48. The touch actuated electronic switch means of claim 47, wherein the resistive material comprises a first component selected from the group consisting of conductive and semi-conductive materials dispersed in a binder and arranged to cohesively bind the first component into a unitary electrically resistive film.

49. The touch actuated electronic switch means of claim 48, wherein the resistive coating is coupled to the input conductor by material of the resistive coating extended around an edge of the touch portion.

50. The touch actuated electronic switch means of claim 49, wherein the resistive material provides a durability and wear-resistant hardness sufficient to allow the coating a life commensurate with the expected life of the touch actuated electronic switch.

51. The touch actuated electronic switch means of claim 50, wherein the resistive material is disposed in an encapsulating relationship upon the touch portion and provides a sealing coating to the touch actuated electronic switch for isolation against humid environments.

52. The touch actuated electronic switch means of claim 51, wherein the resistive material is of a resistance sufficiently high in value to define a current below the destructive amount tolerable by the microelectronics.

53. The touch actuated electronic switch means of claim 51, wherein the resistive material is applied to form a pattern of useful switch indicia.

54. The touch actuated electronic switch means of claim 47 wherein the resistive material is applied to form a pattern of useful switch indicia.

55. The touch actuated electronic switch means of claim 47 wherein the resistive material is of a resistance sufficiently high in value to define a current below the destructive amount tolerable by the microelectronics.

56. The touch actuated electronic switch means of claim 47, wherein the resisitive coating is coupled to the input conductor by material of the resistive coating extended around an edge of the touch portion.

57. The touch actuated electronic switch means of claim 47, wherein the resistive material is disposed in an encapsulating relationship upon the touch portion and provides a sealing coating to the touch actuated electronic switch for isolation against humid environments.

58. The touch actuated electronic switch means of claim 57, wherein the resistive coating is coupled to the input conductor by material of the resistive coating extended around an edge of the touch portion.

59. The touch actuated electronic switch means of claim 46, wherein the resistive material comprises a first component selected from the group consisting of conductive and semi-conductive materials dispersed in a binder and arranged to cohesively bind the first component into a unitary electrically resistive film.

60. The touch actuated electronic switch means of claim 59, wherein the resistive coating is coupled to the input conductor by material of the resistive coating extended around an edge of the touch portion.

61. The touch actuated electronic switch means of claim 59, wherein a non conductive masking material is provided defining a generally centrally located aperture therein, the masking material preventing the touch of a human from access to the edges of the resistive material while the aperture therein provides access of the human to that portion of the resistive material disposed generally centrally upon the touch portion.

62. The touch actuated electronic switch means of claim 59 wherein the resistive material is applied to form a pattern of useful switch indicia.

63. The touch actuated electronic switch means of claim 59, wherein the resistive material is disposed in an encapsulating relationship upon the touch portion and provides a sealing coating to the touch actuated electronic switch for isolation against humid environments.

64. The touch actuated electronic switch means of claim 46, wherein the resistive material is applied to form a pattern of useful switch indicia.

65. The touch actuated electronic switch means of claim 46, wherein the resistive material is of a resistance sufficiently high in value to define a current below the destructive amount tolerable by the microelectronics.

66. The touch actuated electronic switch means of claim 46, wherein the resistive material provides a durability and wear-resistant hardness sufficient to allow the coating a life commensurate with the expected life of the touch actuated electronic switch.

67. The touch actuated electronic switch means of claim 46, wherein the resistive coating is coupled to the input conductor by material of the resistive coating extended around an edge of the touch portion.

68. The tcuch actuated electronic switch means of claim 46, wherein the resistive material is disposed in an encapsulating relationship upon the touch portion and provides a sealing coating to the touch actuated electronic switch for isolation against humid environments.

69. The touch actuated electronic switch means of claim 47, wherein the resistive material comprises a component selected from the group consisting of conductive and semiconductive materials applied to the touch portion as a cohesive film to form an electrically unitary resistive film.

70. The touch actuated electronic switch means of claim 69, wherein the resistive coating is coupled to the input conductor by material of the resistive coating extended around an edge of the touch portion.

71. The touch actuated electronic switch means of claim 70, wherein the resistive material provides a durability and wear-resistant hardness sufficient to allow the coating a life commensurate with the expected life of the touch actuated electronic switch.

72. The touch actuated electronic switch means of claim 71, wherein the resistive material is disposed in an encapsulating relationship upon the touch portion and provides a sealing coating to the touch actuated electronic switch for isolation against humid environments.

73. The touch actuated electronic switch means of claim 72, wherein resistive material is of a resistance sufficiently high in value to define a current below the destructive amount tolerable by the microelectronics.

74. The touch actuated electronic switch means of claim 73, wherein the resistive material is applied to form a pattern of useful switch indicia.

75. The touch actuated electronic switch means of claim 46, wherein the resistive material comprises a component selected from the group consisting of conductive and semi-conductive materials applied to the touch portion as a cohesive film to form an electrically unitary resistive film.

76. The touch actuated electronic switch means of claim 75, wherein the resistive coating is coupled to the input conductor by material of the resistive coating extended around an edge of the touch portion.

77. The touch actuated electronic switch means of claim 75, wherein a non conductive masking material is provided defining a generally centrally located aperture therein, the masking material preventing the touch of a human from access to the edges of the resistive material while the aperture therein provides access of the human to that portion of the resistive material disposed generally centrally upon the touch portion.

78. The touch actuated electronic switch means of claim 75, wherein the resistive material is applied to form a pattern of useful switch indicia.

79. The touch actuated electronic switch means of claim 75, wherein the resistive material is disposed in an encapsulating relationship upon the touch portion and provides a sealing coating to the touch actuated electronic switch for isolation against humid environments.

* * * * *